United States Patent [19]

Curiel

[11] Patent Number: 4,676,280

[45] Date of Patent: Jun. 30, 1987

[54] LIQUID RESERVOIR AND METHOD OF USING A VEHICLE TO DISPENSE LIQUID THEREFROM

[75] Inventor: Yoram Curiel, Aurora, Colo.

[73] Assignee: Flexcel International, Inc., Denver, Colo.

[21] Appl. No.: 840,799

[22] Filed: Mar. 18, 1986

[51] Int. Cl.⁴ .............................................. B65B 3/04
[52] U.S. Cl. ........................................ 141/1; 141/250; 141/114; 222/92; 383/904; 383/906
[58] Field of Search .................... 141/1, 5, 114, 392, 141/389, 65, 98, 311 R; 222/1, 92, 107; 150/55; 169/30, 62, 73; 280/4; 244/135 R, 135 B; 383/904, 906, 36

[56] References Cited

U.S. PATENT DOCUMENTS

| | | | |
|---|---|---|---|
| 183,690 | 10/1876 | Loomis | 141/114 |
| 637,242 | 11/1899 | Ehrman | 141/114 |
| 1,660,713 | 2/1928 | Kauch et al. | 141/114 |
| 2,401,950 | 6/1946 | McMahan | 152/415 |
| 2,430,905 | 11/1947 | Bradley | 150/1 |
| 2,519,393 | 8/1950 | Noyes | 244/135 |
| 2,719,628 | 10/1955 | Ivanoff | 206/47 |
| 2,724,418 | 11/1955 | Krupp | 150/0.5 |
| 2,784,755 | 3/1957 | Bender | 150/0.5 |
| 2,795,245 | 6/1957 | Meehan | 141/26 |
| 3,082,286 | 3/1963 | Schuster | 136/162 |
| 3,133,566 | 5/1964 | Hoss | 141/350 |
| 3,169,581 | 2/1965 | Cummins | 169/24 |
| 3,260,412 | 7/1966 | Larkin | 222/107 |
| 3,282,361 | 11/1966 | Mackie | 180/7 |
| 3,334,676 | 8/1967 | Girard | 150/0.5 |
| 3,416,762 | 12/1968 | Headrick | 248/361 |
| 3,606,090 | 9/1971 | Byers | 222/102 |
| 3,760,431 | 9/1973 | Schwibner | 4/156 |
| 3,788,369 | 1/1974 | Killinger | 141/114 |
| 4,009,622 | 3/1977 | Hinderks | 74/492 |
| 4,322,019 | 3/1982 | Smith | 222/83.5 |

FOREIGN PATENT DOCUMENTS 911267 7/1946 France .
7814109 12/1979 France .

Primary Examiner—Houston S. Bell, Jr.
Attorney, Agent, or Firm—Arnold B. Silverman

[57] ABSTRACT

A method of dispensing a liquid including providing a liquid containing resilient storage reservoir, positioning the reservoir in the path of traction portions a vehicle, providing a shroud which is generally outwardly open and adapted to receive a hose and storing the hose therein. The hose is removed from the shroud and secured to connector which communicates with the interior of the reservoir. The vehicle is moved over the reservoir in such a manner that the traction portions runs over at least a portion of the liquid storage reservoir in a generally longitudinal axial direction to urge the liquid out of the reservoir while resisting substantial lateral expansion of the reservoir in front of the traction portions. The method and reservoir may be employed to refuel a vehicle by connecting the reservoir with a fuel inlet of the vehicle. The hose is preferably secured within the shroud when the reservoir is not receiving or dispensing liquid. Reservoir engaging devices are provided to facilitate handling as well as purging and drying of the reservoir. Apparatus for bleeding undesired air out of the reservoir may be provided.

25 Claims, 9 Drawing Figures

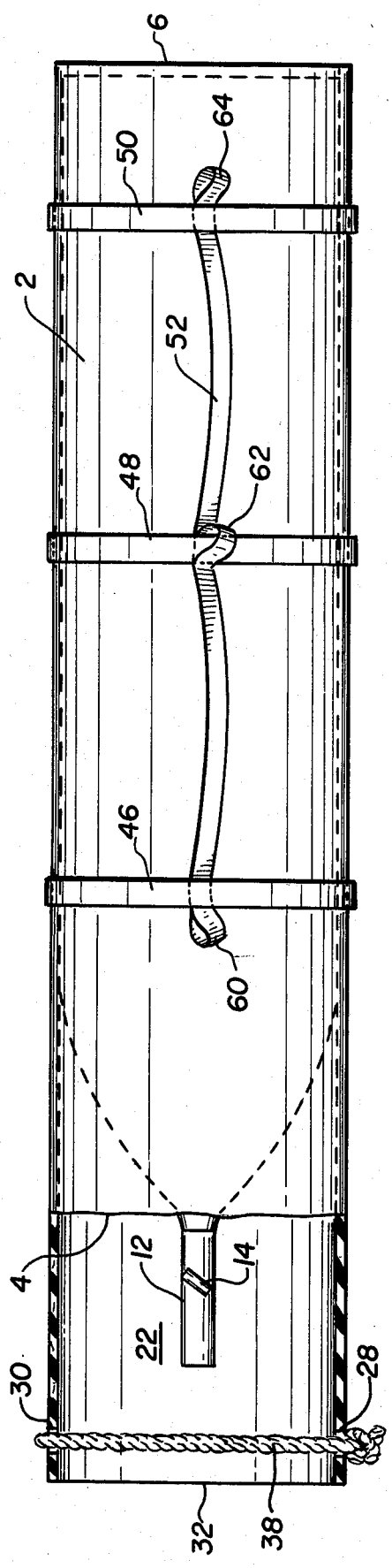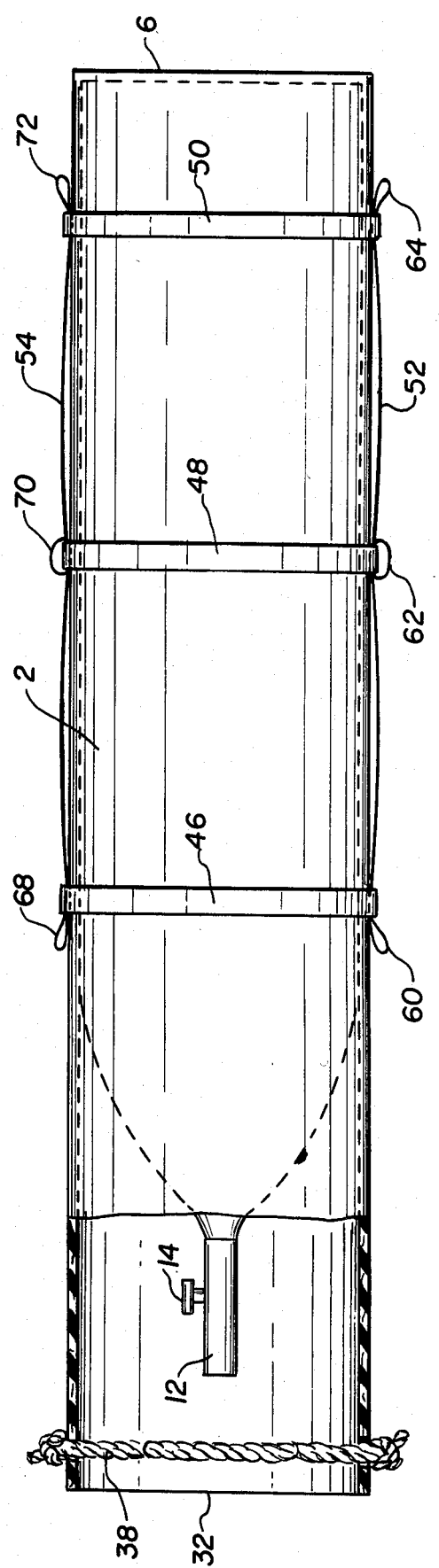
FIG. 1
FIG. 2

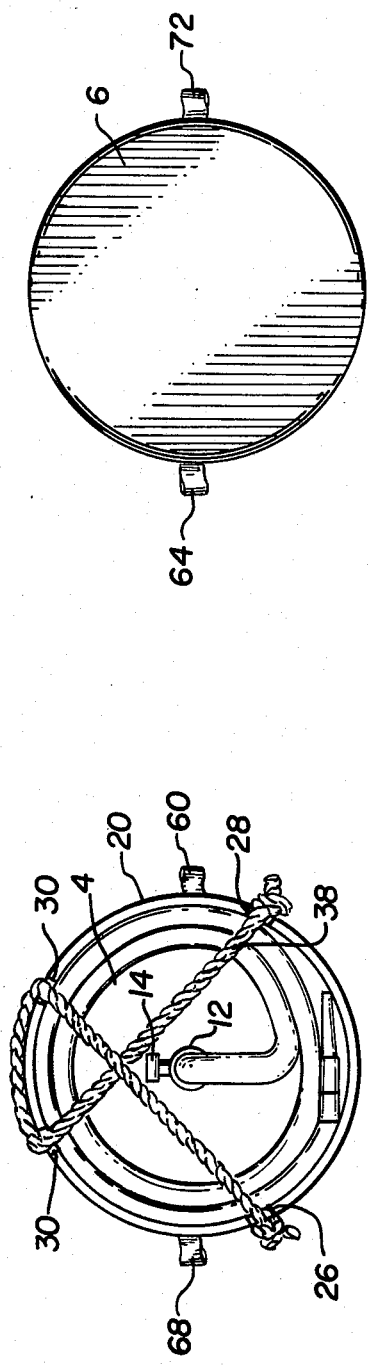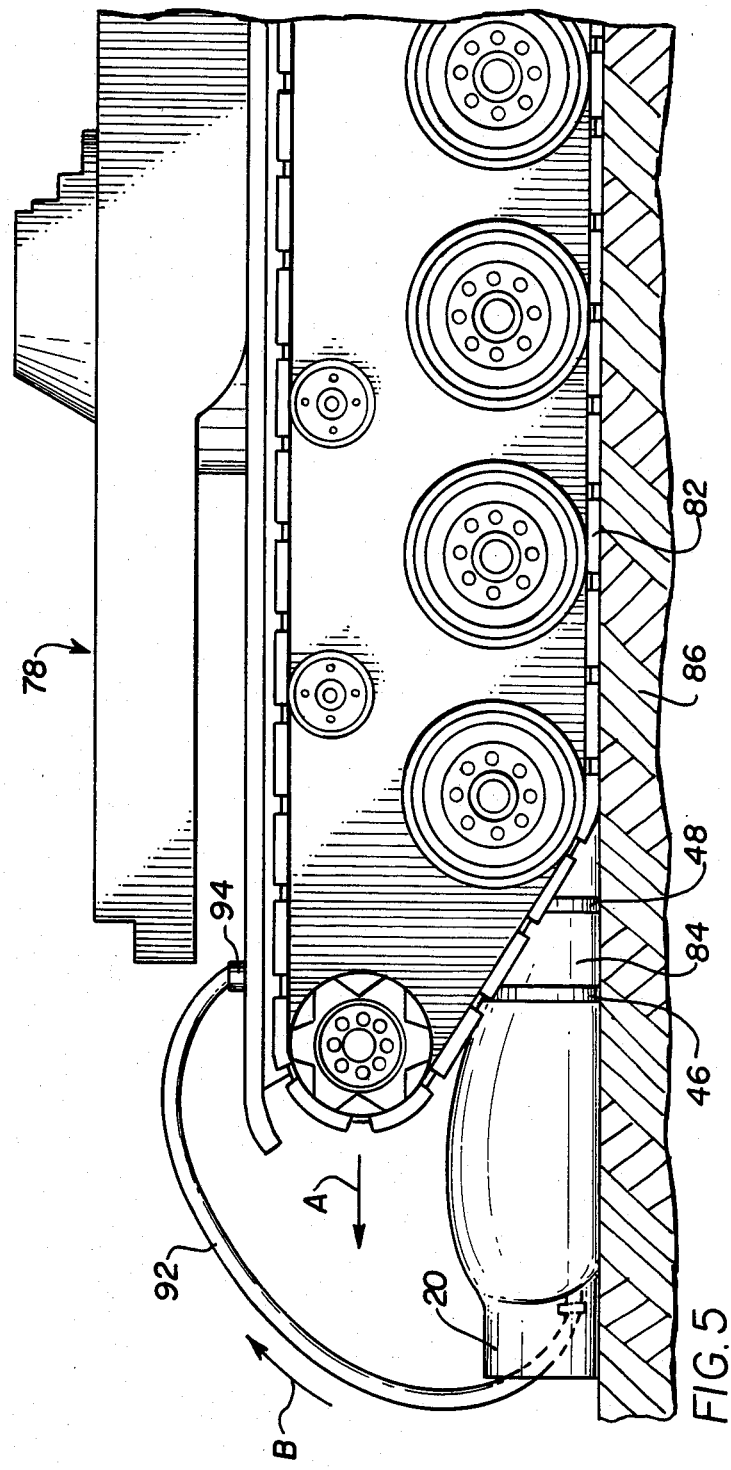

LIQUID RESERVOIR AND METHOD OF USING A VEHICLE TO DISPENSE LIQUID THEREFROM

BACKGROUND OF THE INVENTION

1. Field Of The Invention

This invention relates to a method of dispensing a liquid by means of a vehicle and, more specifically, it relates to such a method which involves a uniquely designed compressible reservoir which is adapted to be compressed between the ground and the vehicle traction means so as to express liquid from the reservoir.

2. Description Of The Prior Art

Systems for remote delivery of liquids, such as fuel, water for drinking, bathing, cooking or other purposes, agricultural irrigation liquids and fire extinguishing materials have been known. One common approach has been to employ tanker trucks having a rigid or flexible reservoir of the liquid and an associated power driven pump to dispense the same.

With respect to most needs for refueling vehicles, it has generally been known to position the vehicle adjacent to a stationary, permanently installed fuel reservoir and to employ a power energized (as by electric motor or internal combustion engine) pump to transfer the fuel from the reservoir to the vehicle's fuel tank.

It has also been known to move such storage reservoirs on vehicles in order that the vehicles carrying the fuel may be moved to the vehicles to receive fuel and to employ power energized pumps to effect the transfer.

In many situations, it is inefficient and sometimes dangerous to rely on such known approaches. One such situation occurs in respect of the need to supply water or to refuel military vehicles, such as tanks, for example, in combat zones. The need to rely on mobile tanker trucks not only substantially increases the amount of time involved, but also in respect of refueling only one or two military vehicles can receive fuel from such a truck at one time. The need to refuel such vehicles substantially increases the risks of loss of life and equipment. A further problem is the uncertainty of being able to drive such a tanker truck to the combat zone. Also, a grouping of such vehicles creates an easy target for the enemy.

It has also been known to use the so-called bladder collapsible storage containers to deliver fuel which is to be transferred by means of a power energized pump. One of the advantages of this approach over the tanker trucks is the ability to put the trucks to other uses and the fact that a single vehicle can return a large number of empty bladders to every filling center.

It has also been known to employ the "fuel cell" which by means of a portable power pump and skilled personnel can be used to deliver fuel to military vehicles. One of the advantages of such fuel cells is that they are small enough to be delivered by helicopter and dropped to the desired location. It also requires a power pump and special packaging.

A further problem with the approaches requiring a power pump is that the pump may break down at a critical time.

Yet another problem exists in connection with the need to refuel or provide a supply of water or other liquids at sights of major disasters, such as earthquakes, floods and severe storms, for example. In such circumstances electricity with which to operate pumps may be unavailable and access roads may be blocked or severely damaged.

It has been known to drop liquid containing vessels from planes to deliver the same to a desired location. See U.S. Pat. Nos. 3,334,676 and 2,784,755. This patent also contains an allusion to using a vehicle to discharge contents from the container.

In spite of the previously known systems for refueling vehicles at remote locations, such as in military combat zones, for example, or other systems for remote delivery of liquids, there remains the need for an improved method and associated reservoir.

SUMMARY OF THE INVENTION

The present invention is an improvement over the invention disclosed in my prior U.S. Pat. No. 4,567,918 entitled "LIQUID RESERVOIR AND METHOD OF DISPENSING A LIQUID THEREFROM BY MEANS OF A VEHICLE" which issued on Feb. 4, 1986. The disclosure of this patent is expressly incorporated herein by reference.

The approach of the present invention is to provide a method of dispensing liquids to remote locations without requiring dependence on power driven pumps or tanker trucks and to facilitate hose storage, purging of the system and purging of undesired air from the system.

The liquid storage and dispensing reservoir of the present invention is collapsible and has an elongated unitary reservoir body composed of a resilient material. The reservoir has a fluid storage chamber which cooperates with outlet means which extend outwardly therefrom for providing communication with the interior of the storage chamber. Hose means are adapted to be operatively associated with the outlet means and a tubular shroud receives the hose means for storage. Hose securing means for retaining the hose within the shroud are preferably provided.

The reservoir preferably has reservoir handling means which facilitate not only movement of the reservoir, but also hanging of the same to facilitate purging and drying of the system.

It is an object of the present invention to provide an improved, efficient means for delivering liquid by means of a vehicle.

It is a further object of the invention to provide an efficient and rapid method of refueling vehicles at a remote location.

It is a further object of the present invention to provide such methods wherein the use of tanker trucks, power operated pump means and skilled personnel is not required.

It is a further object of the present invention to provide a compressible reservoir which is adapted to receive, store and deliver liquid, such as a fuel, to a vehicle's tank and which system provides integral means for storage of discharge hose means.

It is a further object of the present invention to provide such reservoirs which resist undesired lateral expansion and are readily reusable.

These and other objects of the invention will be more fully understood from the following description of the invention on reference to the illustrations appended hereto.

BRIEF DESCRIPTION OF THE DRAWINGS

FIG. 1 is a front elevational view of a form of reservoir of the present invention, partly in section.

FIG. 2 is a top plan view of the reservoir of FIG. 1, partly in section.

FIG. 3 is a left side view of the reservoir of FIGS. 1 and 2.

FIG. 4 is a right side view of the reservoir of FIGS. 1 through 3.

FIG. 5 illustrates a vehicle in the process of refueling using a fuel storage reservoir of the present invention.

DESCRIPTION OF THE PREFERRED EMBODIMENTS

Figure 6:
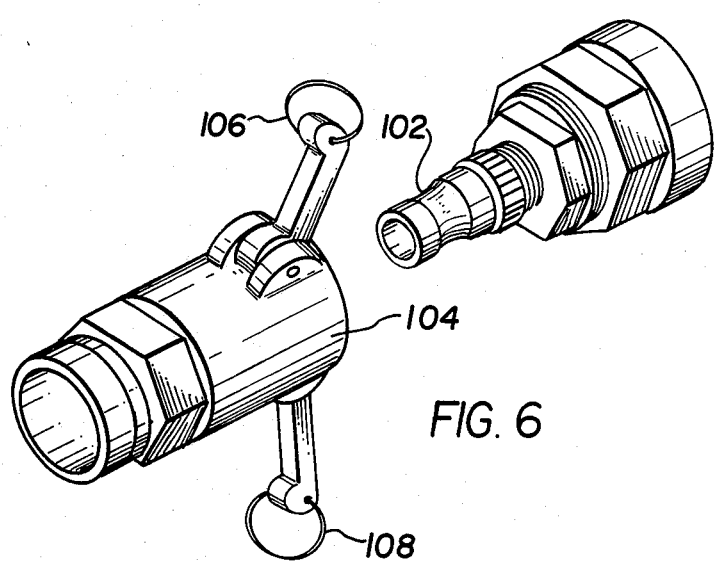
FIG. 6 is a schematic illustration of a preferred pair of locking means for joining a hose to outlet means of the present invention.

As used herein the term "traction means" refers to a vehicle's ground engaging means which permits it to move along the ground and shall expressly include, but not be limited to, wheels, tire, endless tread belts and other such members.

As used herein the term "ground" shall be intended to refer broadly to the surface supporting a vehicle be it earth, gravel, paved roads or any other surface on which liquid delivery is to be achieved.

As used herein "fire extinguishing material" shall refer to a liquid, slurry or foam, with or without flame retarding additives and shall expressly include water.

While for clarity of description specific reference will be made to use of the invention in connection with a preferred use in dispensing of fuels, other uses including but not limited to use in connection with drinking water, bathing water, plant irrigation and fire extinguishing material, for example, will be equally advantageous.

Referring more specifically to FIGS. 1 through 4, it will be appreciated that the reservoir in the form shown has an elongated generally cylindrical lateral body wall 2 which terminates in a generally circular front wall 4 and a generally circular rear wall 6. The reservoir body is preferably composed of a resilient material so as to accomodate changes in shape of the reservoir depending upon the amount of liquid contained therein and the extent to which a vehicle has compressed the same between the vehicle traction means and the ground.

Outlet means 12 are secured to and cooperate with front wall 4 and are adapted to provide communication between the interior of the reservoir and the exterior to permit liquid to be introduced into the reservoir and liquid to be removed therefrom. In general, the outlet means 12 may take the form of a tube. In the form shown, valve 14 is adapted to open and close the outlet means 12 to initiate and terminate flow therethrough. As will be described hereinafter, it is contemplated that hose means (not shown in these views) will be secured to the outlet means 12 to facilitate controlled discharge of the liquid in the reservoir.

One of the improvements which the present invention provides over my prior invention disclosed in U.S. Pat. No. 4,567,918 is the presence of a tubular shroud 20 which may be composed of the same material as the reservoir or, alternatively, may be composed of other materials. If desired, in order to maintain a desired degree of stiffness, the shroud may be provided of uniform material of suitable thickness or of material containing reinforcing means such as reinforcing rods or fibers placed within the material. It will be noted that the annular shroud 20 is preferably annularly substantially continuous and cooperates with the front wall 4 to define a recess 22 within which a hose may be stored. In this manner, the hose may be rolled into a spool-like configuration and stored within recess 22. This also facilitates delivery of the hose and reservoir as a unit. Such delivery is particularly important with respect to reservoir devices which are going to be dropped from planes in order to make sure that after bouncing along the ground the hose and the reservoir are in close proximity so as to facilitate ready engagement and use.

It is contemplated as is shown in FIG. 3 that a plurality of openings 26, 28, 30, 32 of any desired number or position will be located through the free end portion of the shroud and preferably within about 3 to 10 inches of free end 32. A rope, a strap, cable or other hose securing means such as a metal, rope or synthetic material elongated securing member may then be threaded through the openings and tied so as to retain the hose within recess 22. As is shown in FIG. 3, rope 38 passes through opening 26 and then through opening 30 from where it goes exteriorly of the shroud into opening 32 through opening 28 and out of the other end. The free ends may either be knotted so as to resist undesired return passage through openings 26, 28 or may be tied to each other if desired, or other suitable retainer means may be employed.

It will be appreciated that shroud 20 may be integrally formed with the reservoir body or may be separately formed and secured thereto. In order to facilitate ease of handling, it is desirable to provide external means which may be gripped manually or by suitable lifting equipment, such as a crane, forklift or hoist. In the embodiment shown in FIGS. 1 through 4, a series of circumferential strap members 46, 48, 50 are secured to the reservoir and are connected to each other by means of a generally longitudinally oriented pair of straps 52, 54. Strap 52 has in the region of straps 46, 48, 50 engageable loops 60, 62, 64. Similarly, strap 54 has engageable loops 68, 70, 72. Alternately, if desired, handles may be provided integrally within the body wall 2, as by molding, for example.

Referring to FIG. 5, there is shown a vehicle in the form of a military tank 78 which is disposed with its traction means 82 in the form of an endless tread member in contacting overlying relationship with the reservoir 84 to compress the same between the tread 82 and the underlying ground 86. The tank is moving progressively in the direction indicated by the arrow A.

The hose means 92 has been removed from recess 22 of shroud 20 and has been sealingly engaged in a manner to be described hereinafter with outlet means 12 such that with the hose means extending into fuel filler inlet 94 fuel will flow in the direction of the arrow B as the tank advances in the direction A.

Referring to FIG. 6, there is shown a preferred form of locking means. The outlet means may be provided with a male member 102 which is engageable by a female member 104 which is secured to a free end of the hose means. In the form shown, the locking means 102, 104 take the form of a preferred quick-connect quick-disconnect means which by pulling of rings 106, 108 permit sealing engagement between the male member 102 and the female member 104 to be achieved rapidly. If desired, the male member 102 and the female member 104 may be placed respectively on the hose means 92 and outlet means 12. Also, means other than quick-connect quick-disconnect means may be employed. If desired, the outlet and hose may be permanently attached to each other.

Figure 7:
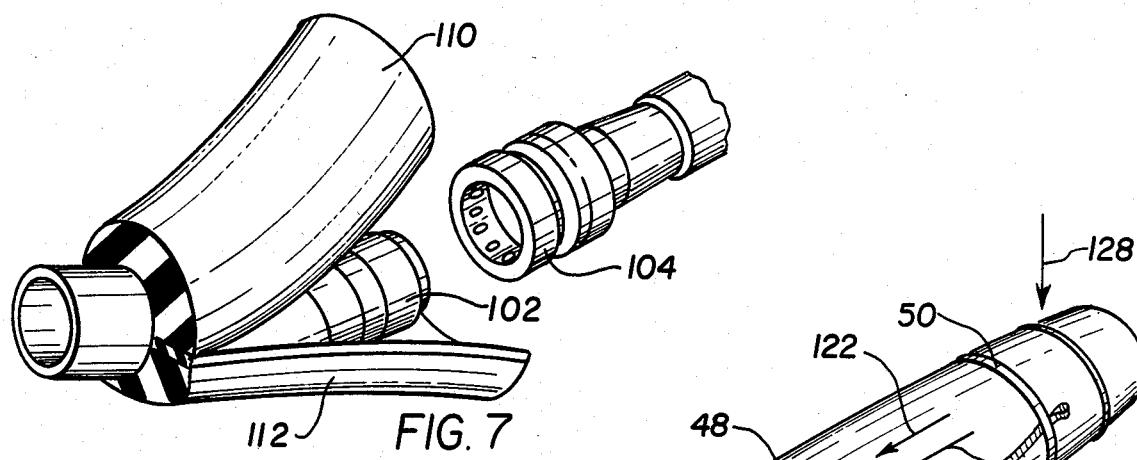
FIG. 7 is a modified form of locking means showing modified form of outlet means.

Referring to FIG. 7, a further feature of the invention will be considered. The male locking means 102 which in the form shown is part of outlet means 12 cooperates with female locking means 104 which is shown without rings 106, 108 in this view. A slit sleeve of resiliently compressible material such as rubber or other resiliently compressible materials has leaves 110, 112 which will under normal circumstances when not in use under the natural spring action of the material be in relative closed position surrounding the outlet means 112 and male member 102. In this manner, additional protection is provided for the outlet means. Should a vehicle run over the shroud 20 the danger of undesired damage to outlet means 12 is reduced as a result of the protection provided by the shroud and the further protection provided by the split tube leaves 110, 112.

Figure 8:
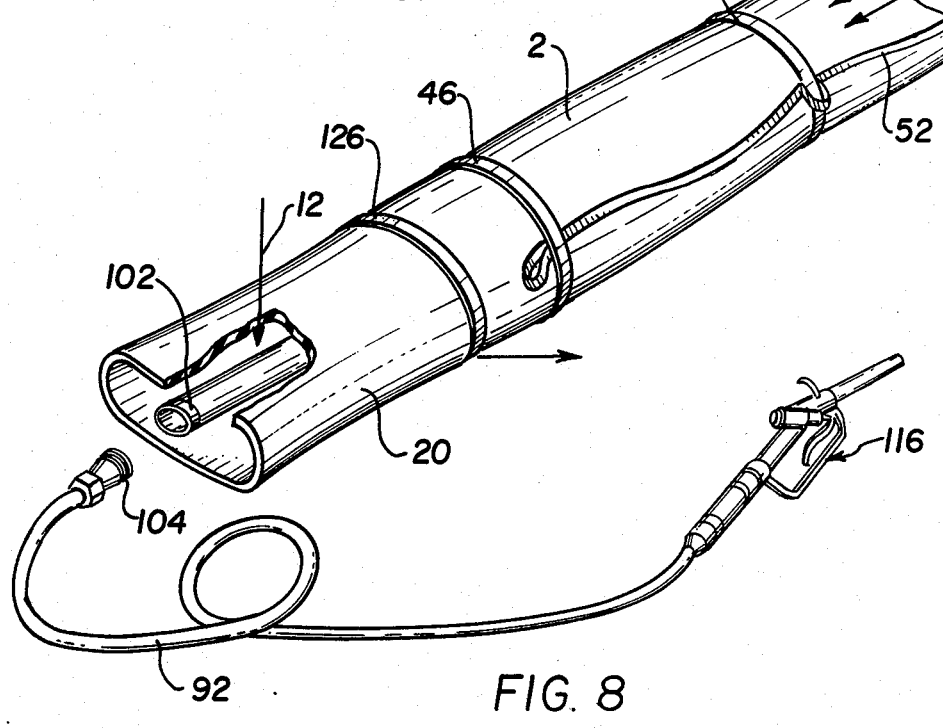
FIG. 8 is a perspective view of a form of reservoir of the present invention.

Referring to FIG. 8, additional features of the present invention will be considered. As is shown in FIG. 8, the reservoir is disposed in a horizontal position with the locking means 102, 104 disposed in spaced adjacent relationship. The opposite end of the hose means 116 may have any desired sort of valve such as a manually operated valve of the type frequently employed in dispensing gasoline. Marking indicia is preferably provided on the exterior of the reservoir in order to provide information regarding the nature of the contents and the manner in which the reservoir will be employed. It is noted that markings 120, 122 are arrows provided on the exterior surface 2 of the reservoir and point in the direction which the vehicle should move in moving from the closed end of the reservoir 6 to the outlet means 12. Mark 126 is preferably a mark which identifies the position of end wall 4 (not shown in this view) in order that the vehicle may be instructed to stop before its traction means progresses into a position where it is overlying the outlet means. Marking band 128 is preferably a color coded band which indicates whether the reservoir has been used for fuel, water, fire extinguisher or any other material so as to avoid undesired comingling of the materials.

Referring once again to FIGS. 1 through 4 it will be appreciated that in general it will be desired after use to purge the system of the prior material. This may readily be accomplished by providing a suitable opening in the reservoir adjacent to end wall 6 either on the end wall or on the sidewall 2 (not shown) in order to facilitate connection to a source of flushing fluid. Valve 14 may be then opened and the cleansing or purging action allowed to take place. After this has been accomplished it will generally be desired to hang the reservoir with its longitudinal axis in a generally vertical direction. This may readily be accomplished by supporting the reservoir by means of loops 64, 72. After residual liquid has drained out of the outlet means 12, the reservoir may be allowed to hang until its interior has dried. In this manner, spent material such as fire extinguishing solution, for example, or undesired water which may have condensed in the reservoir and may interfere with future use may be eliminated. It is generally desirable to flush the reservoir with a material which is compatible with the material which is used in the reservoir. For example, kerosene may be employed to flush fuel and water may be employed to flush other materials.

Figure 9:
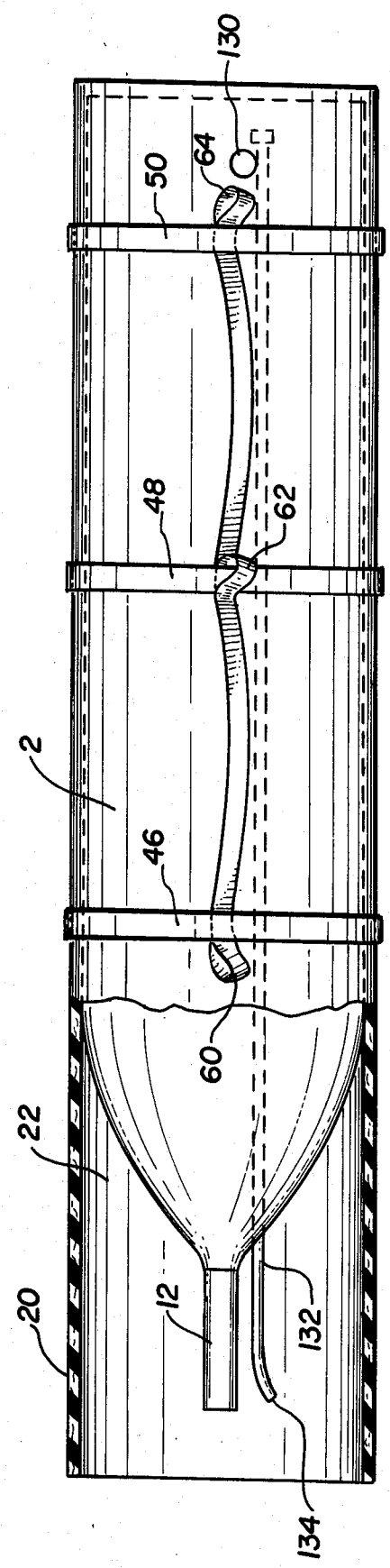
FIG. 9 is a partially schematic view of a form of the present invention showing air bleeding means.

Referring now to FIG. 9, there is shown a means of bleeding undesired air from the reservoir interior. An opening 130 having a suitable pressure sensitive valve is provided in reservoir wall 2. The opening in valve output is in communication with resilient tube 132 which runs generally longitudinally inside the reservoir and is preferably positioned freely inside the container and emerges in the forward recess 22 provided by shroud and has an air discharge end 134. The tube 132 may emerge from body 2 by an opening in the wall (not shown) or through outlet means 12. A suitable closure may be provided over cap 134 during transport of the reservoir if desired.

If desired, the air bleeder line 132 may be employed to introduce air into the container interior to provide a compressible air cushion to assist the container which filled with liquid to absorb shock when it is dropped and hits the ground. For this purpose the air may be provided in such volume as to occupy about 5 to 20 percent of the volume of the container interior and may be bled prior to discharge of the liquid.

A further use of injected air is to provide floating capability to the filled container.

While for convenience of reference the end wall 6 remote from discharge means 12 is disposed generally in a plane perpendicular to the longitudinal axis of the container, as shown in FIGS. 1, 2 and 4, other configurations may be provided. For example, the remote end may taper outwardly and rearwardly as by a uniform taper toward the longitudinal axis. Also, this portion may be formed as an open tube which is clamped closed as by any suitable mechanical clamp to establish sealed closure of the tube.

It will be appreciated, therefore, that the present invention provides an efficient means of storing a hose and transporting the same as part of the reservoir unit. It further provides for rapid securement of the hose and transfer of the liquid. In addition, the invention facilitates improved handling of the unit, purging of the same and hanging up the same to dry. Finally, air bleeding where desired may be readily accomplished.

Whereas particular embodiments of the invention have been described above for purposes of illustration, it will be evident to those skilled in the art, that numerous variations of the details may be made without departing from the invention as defined in the appended claims.

I claim:

1. A collapsible liquid storage and dispensing reservoir comprising
   an elongated unitary reservoir body composed of a resilient material,
   said reservoir having a fluid storage chamber,
   outlet means extending outwardly from one end of said reservoir for permitting introduction of liquid into said storage chamber and removal of liquid therefrom,
   hose means operatively associated with said outlet means, and
   tubular shroud means extending from said reservoir means for storing said hose means, whereby withdrawal of at least a portion of said hose means from said shroud means will create liquid discharge from said reservoir when vehicle traction means run over said reservoir in a longitudinal axial direction to compress said reservoir and progressively urge said liquid from said reservoir while resisting substantial lateral expansion of said reservoir in front of said traction means.

2. The reservoir of claim 1 including
said outlet means at least partially disposed within said shroud means.

3. The reservoir of claim 2 including
valve means operatively associated with said outlet means to permit flow therethrough.

4. The reservoir of claim 2 including
a said tubular shroud means extending from each end of said elongated reservoir body.

5. The reservoir of claim 2 including
fastening means for securing said hose means within said shroud means.

6. The reservoir of claim 5 including
said fastening means having apertures within said shroud means, and
means passing through said apertures to retain said hose means within said shroud.

7. The reservoir of claim 5 including
said outlet means having first locking means,
said hose means having second locking means, and
said first and said second locking means being sealingly interengageable when it is desired to discharge liquid from said reservoir chamber.

8. The reservoir of claim 7 including
said first locking means and said second locking means having quick connect and disconnect means.

9. The reservoir of claim 7 including
resiliently compressible material disposed over the exterior of at least a portion of said outlet means.

10. The reservoir of claim 9 including
said hose means having hose valve means for providing control over delivery of liquid from said reservoir chamber.

11. The reservoir of claim 1 including
marking means on the exterior of said reservoir for providing information regarding the use or contents of said reservoir.

12. The reservoir of claim 11 including
said marking means including information regarding the desired direction of vehicle travel over said reservoir.

13. The reservoir of claim 1 including
reservoir engaging means secured to the exterior thereof, whereby interengagement and lifting of said reservoir is facilitated.

14. The reservoir of claim 13 including
positioning at least some of said reservoir engaging means adjacent to one end of said reservoir, whereby said reservoir may be supported by said reservoir engaging means in a generally vertical orientation so as to facilitate drainage and drying of the interior thereof.

15. The reservoir of claim 1 including
air bleeder means in communication with said reservoir chamber for purging undesired air therefrom.

16. The reservoir of claim 15 including
said air bleeder means including a resilient tube disposed interiorly of said chamber and adapted to be in communication with the exterior thereof.

17. The reservoir of claim 16 including
air valve means for opening at a predetermined pressure for permitting air to flow from said reservoir chamber through said air bleeder means.

18. The reservoir of claim 17 including
said air bleeder means being in communication with said chamber at a position closer to the free end of said reservor than to the outlet means.

19. A method of dispensing a liquid by means of a vehicle comprising
providing an elongated liquid containing storage reservoir having outlet means,
a generally tubular shroud extending outwardly from said reservoir,
hose means for dispensing liquid from said reservoir disposed within said shroud,
positioning said reservoir in the path of traction means of said vehicle,
removing at least a portion of said hose from said shroud,
connecting said hose means to said outlet means, and
moving said vehicle so as to cause said traction means to run over at least a portion of said reservoir in a generally longitudinal axial direction to progressively compress said reservoir and progressively urge said liquid out of said reservoir while resisting substantial lateral expansion of said reservoir in front of said traction means.

20. The method of claim 19 including
providing said resilient reservoir as a fuel storage reservoir,
providing fuel as said liquid in said reservoir, and
prior to urging said fuel out of said reservoir connecting said hose means with a fuel inlet of said vehicle.

21. The method of claim 20 including
providing securing means for retaining said hose means within said shroud prior to use, and
opening said securing means to permit removal of said hose means prior to connecting said hose means to said oulet means.

22. The method of claim 21 including
after discharging liquid from said reservoir, purging said reservoir of said liquid and permitting said reservoir to dry.

23. The method of claim 20 including
providing said vehicle as a military tank having traction means in the form of endless tread means, and
running one of said endless tread means over said storage reservoir.

24. The method of claim 23 including
controlling the rate of speed of said vehicle so as to achieve a desired rate of flow of fuel into said vehicle.

25. The method of claim 22 including
reservoir lifting means secured to the exterior of said reservoir, and
employing said lifting means to hang said reservoir in a generally longitudinal position.

* * * * *